(12) United States Patent
Lee et al.

(10) Patent No.: US 8,367,880 B2
(45) Date of Patent: Feb. 5, 2013

(54) DEVICE AND METHOD FOR CONTINUOUS HYDRATE PRODUCTION AND DEHYDRATION BY CENTRIFUGAL FORCE

(75) Inventors: Ju Dong Lee, Busan (KR); Jin Woo Lee, Busan (KR); Kyung Chan Kang, Daegu (KR); Kyeong Nam Park, Busan (KR); Mun Keun Ha, Gyeongsangnam-do (KR); Seok Ku Jeon, Seoul (KR); Hoon Ahn, Seoul (KR); Ta Kwan Woo, Busan (KR)

(73) Assignees: Korea Institute of Industrial Technology, Chungcheongnam-Do (KR); Samsung Heavy Industries Co., Ltd., Gyeongsangnam-Do (KR); Hyundai Engineering Co., Ltd., Seoul (KR); Daewood Engineering & Construction Co., Ltd., Seoul (KR); Sungilturbine Co., Ltd., Busan (KR)

( * ) Notice: Subject to any disclaimer, the term of this patent is extended or adjusted under 35 U.S.C. 154(b) by 156 days.

(21) Appl. No.: 12/785,599

(22) Filed: May 24, 2010

(65) Prior Publication Data

US 2011/0263913 A1    Oct. 27, 2011

(30) Foreign Application Priority Data

Apr. 26, 2010   (KR) .................. 10-2010-0038682

(51) Int. Cl.
*C07C 9/02*       (2006.01)
*B01J 19/00*     (2006.01)
(52) U.S. Cl. .......... 585/15; 422/162; 422/202; 422/209; 210/360.1
(58) Field of Classification Search .................... 585/15; 422/162, 202, 209; 210/360.1
See application file for complete search history.

(56) References Cited

U.S. PATENT DOCUMENTS

| 5,536,893 | A | 7/1996 | Gudmundsson |
| 6,855,852 | B1 | 2/2005 | Jackson et al. |
| 7,964,150 | B2 * | 6/2011 | Balczewski ................... 422/129 |
| 7,976,613 | B2 * | 7/2011 | Amin ............................... 95/153 |
| 2005/0033104 | A1 | 2/2005 | van Egmond et al. |

FOREIGN PATENT DOCUMENTS

JP   3-173611 A     7/1991
JP   2001278820 A * 10/2001

(Continued)

OTHER PUBLICATIONS

English Abstract and Machine Translation of JP 2003-041276 A (Feb. 2003).*
English Abstract and Machine Translation of JP 2001-278820 A (Oct. 2001).*

(Continued)

*Primary Examiner* — Jennifer A Leung
(74) *Attorney, Agent, or Firm* — RatnerPrestia

(57) ABSTRACT

Disclosed herein is an apparatus and method for continuously producing and dehydrating gas hydrates. The apparatus includes a gas source, a water source, a reactor, a spinning wheel, and a centrifugal separator. The gas source and the water source are connected to the reactor. Gas and water are respectively supplied from the gas source and the water source into the reactor and react with each other in the reactor to form gas hydrate slurry. The spinning wheel and the centrifugal separator are provided in the reactor. The spinning wheel supplies the formed gas hydrate slurry to the centrifugal separator. The centrifugal separator dehydrates the gas hydrate slurry. Water removed from the gas hydrate slurry by the dehydration of the centrifugal separator is re-supplied into the reactor.

15 Claims, 11 Drawing Sheets

FOREIGN PATENT DOCUMENTS

| | | | | |
|---|---|---|---|---|
| JP | 2003041276 | A | * | 2/2003 |
| JP | 3517832 | B2 | | 4/2004 |
| JP | 2006152027 | A | * | 6/2006 |
| JP | 3891033 | B2 | | 3/2007 |
| JP | 4045476 | B2 | | 2/2008 |
| KR | 10-0786812 | B1 | | 12/2007 |

OTHER PUBLICATIONS

English Abstract and Machine Translation of JP 2006-152027 A (Jun. 2006).*

Notice of Patent Decision for Korean Application No. 10-2010-0038682 dated May 19, 2012 (with English Translation).

* cited by examiner

DEVICE AND METHOD FOR CONTINUOUS HYDRATE PRODUCTION AND DEHYDRATION BY CENTRIFUGAL FORCE

BACKGROUND OF THE INVENTION

1. Field of the Invention

The present invention relates generally to an apparatus and method for continuously producing and dehydrating gas hydrates and, particularly, to an apparatus for continuously producing and dehydrating gas hydrates which includes a gas source, a water source, a reactor which is connected to the gas source and the water source so that gas and water are respectively supplied from the gas source and the water source into the reactor and react with each other to form gas hydrate slurry, a spinning wheel, and a centrifugal separator which are provided in the reactor. The spinning wheel supplies the formed gas hydrate slurry to the centrifugal separator, and the centrifugal separator dehydrates the gas hydrate slurry. Furthermore, the present invention relates to a method for continuously producing and dehydrating gas hydrates using the apparatus.

More particularly, the present invention relates to an apparatus and method for continuously producing and dehydrating gas hydrates in which the centrifugal separator has a screwed rotor and a plurality of openings, thus dehydrating the gas hydrate slurry using centrifugal force. Water which has been discharged out of the centrifugal separator through the openings during the dehydration is re-supplied into the reactor to react gas again, thus enhancing the gas hydrate production efficiency. While the gas hydrate slurry is being formed by reaction between water and gas, the dehydration is simultaneously conducted in the same space, thus making it possible to continuously produce high-density gas hydrates.

2. Description of the Related Art

As is well known to those skilled in the art, clathrate hydrates or gas hydrates comprise two constituents including host molecules which form a hydrogen-bonded solid lattice structure and guest molecules which are trapped in the host molecules. The hydrates are crystalline compounds, for example, in which small molecules of gas, such as methane, ethane, propane, or carbon dioxide, are physically trapped without chemical bonding inside a three-dimensional lattice structure formed by the hydrogen bonding of water molecules.

Gas hydrates were first discovered in 1810 by Sir Humphry Davy of England. In a Bakerian lecture for The Royal Society of London for Improving Natural Knowledge, he published the fact that when chlorine and water react with each other, compounds having structures similar to ice are formed but the temperature of the compounds is higher than 0° C. In 1823, Michael Faraday discovered the fact that a gas hydrate is formed by reacting one chlorine molecule with ten water molecules. To date, scientific research on gas hydrates as one type of phase change material (PCM) have been being conducted. Research into their phase equilibrium, formation/dissociation conditions, coexistence of polycrystals, competitive composition variation in cavities, etc. are representative. In addition, in the microscopic or macroscopic aspect, various detailed research has been being conducted.

About one hundred thirty kinds of guest molecules which can be trapped in host molecules for gas hydrates have been discovered to date. $CH_4$, $C_2H_6$, $C_3H_8$, $CO_2$, $H_2$, $SF_6$, etc. are representative examples of such guest molecules. Furthermore, a gas hydrate crystalline structure forms a polyhedral cavity because of hydrogen bonded host molecules. According to the kind of gas molecules and the formation conditions thereof, the gas hydrate crystalline structures are classified into a body-centered cubic structure I (sI), a diamond cubic structure II (sII) and a hexagonal structure H (sH). In the sI and sII, the size of a guest molecule is the critical factor. In sH, the size and shape of a guest molecule are the critical factors.

The most common guest molecule of gas hydrates which are naturally present in the deep sea and in the permafrost region is methane. Much attention is being focused on such methane as an environmental-friendly clean energy resource because little carbon dioxide ($CO_2$) is generated when it burns. Specially, gas hydrates can be used as energy sources which can substitute for fossil fuels. Furthermore, gas hydrates can be applied to natural gas solidification-storage and transfer using the hydrate structure. In addition, gas hydrates can be used in isolation/storage of $CO_2$ for the prevention of global warming. Furthermore, gas hydrates can be used, particularly, in a desalination apparatus, as a technology for separating gaseous or water solutions. As such, gas hydrates are of great utility.

Such gas hydrates are found mainly in regions adjacent to petroleum or natural gas reservoirs or coal seams, or in low temperature and high pressure bathyal deposits, in particular, continental slopes. Furthermore, gas hydrates may be artificially produced. A representative conventional apparatus for producing gas hydrates typically has the structure illustrated in FIG. 1.

FIG. 1 is a schematic view showing a typical apparatus for producing gas hydrates, according to a conventional technique.

The gas hydrate producing apparatus according to the conventional technique includes a water supply unit 1, a gas supply unit 2, a reactor 3 and a discharge unit 4. Water is supplied from the water supply unit 1 into the reactor 3 and gas is supplied from the gas supply unit 2 into the reactor 3. The water and gas react with each other in the reactor 3. Gas hydrates produced in the reactor 3 are discharged from the reactor 3 through the discharge unit 4. The apparatus 10 may further include an agitator 5 to increase the reaction rate between the water and the gas.

In detail, representative examples of such conventional techniques disclosed in documents will be introduced herein below.

Apparatuses or methods of producing gas hydrates were proposed in Japanese Patent Registration No. 3173611, U.S. Pat. Nos. 5,536,893 and 6,855,852. These conventional techniques have in common the operation of supplying gas, the operation of supplying water, the operation of producing gas hydrate particles by reacting gas and water with each other, and an agglomerating operation. Some of these techniques further include a recycling gas operation and a cooling operation.

Furthermore, a method of producing hydrates using a water spraying manner was proposed in Japanese Patent Registration No. 3517832. In this technique, water is supplied from a water supply unit into a reactor in such a way as to spray water into the reactor. Therefore, when water is supplied into the reactor, the contact area of water with the gas is increased, thereby enhancing the reaction rate between water and gas.

Another conventional technique was proposed in Japanese Patent Registration No. 4045476, entitled "Method and apparatus for producing gas hydrate". In this technique, gas is mixed with and dissolved in water to form reaction water. The reaction water flows through a predetermined pipeline. A separate cooling unit cools the pipeline.

Furthermore, another conventional technique was proposed in Japanese Patent Registration No. 3891033, entitled "Method for continuously producing gas hydrate and apparatus therefor". This apparatus includes a rotating drive shaft, blades and a take-out pipe. The rotating drive shaft is installed upright in a reactor in which water and gas react with each other. The blades are provided at positions spaced apart from the center of the rotating drive shaft with respect to the radial direction by a predetermined distance. The blades are disposed such that the surface of reaction water comes into contact with the blades. The blades rotate around the rotating drive shaft. Slurry which gathers around the rotating drive shaft because of the rotation of the blades is discharged below the reactor through the discharge pipe.

In addition, another conventional technique was proposed in Korean Patent Registration No. 0786812, entitled "Gas hydrate formation and decomposition apparatus". The apparatus according to this technique includes a reaction chamber in which gas hydrates are formed by water and gas reacting with each other or are dissolved, and a constant temperature maintaining tank which maintains the temperature of the water in the reaction chamber constant.

However, the apparatuses according to the above-mentioned conventional techniques have in common the following problems.

In the conventional apparatuses, it is difficult to consecutively produce gas hydrates. In the case of the apparatuses provided in Japanese Patent Registration No. 3173611, U.S. Pat. Nos. 5,536,893, 6,855,852, Japanese Patent Registration No. 3517832 and Korean Patent Registration No. 0786812, several gas hydrates can be produced in a laboratory. However, few concrete studies into a process of extracting gas hydrates from reaction water formed by gas and water have been carried out. Furthermore, in these apparatuses, excessive time and power are required to produce gas hydrates. Therefore, it is almost impossible to consecutively produce gas hydrates.

Moreover, in the apparatuses according to the conventional techniques, the process of producing gas hydrates is very long and complex. In particular, the technique disposed in Japanese Patent Registration No. 4045476 provides the apparatus for consecutively producing gas hydrates, but the process of extracting gas hydrates from a slurry of reaction water is very complex. Furthermore, in all operations of the gas hydrate producing process, the temperatures and pressures of components of the apparatus must be maintained constant. Hence, substantially, there are many restrictions in the process of consecutively producing gas hydrates. In addition, it is also very difficult to maintain the temperature and pressure of all components constant in all of the operations of the process.

Particularly, the conventional techniques have major problems in which the operation of forming gas hydrate slurry by reaction between gas and water is conducted separately from the operation of dehydrating the gas hydrate slurry. Thereby, the production of gas hydrates and the dehydration thereof cannot be conducted in the same space at the same time, thus increasing the time taken to continuously produce gas hydrates.

SUMMARY OF THE INVENTION

Accordingly, the present invention has been made keeping in mind the above problems occurring in the prior art, and an object of the present invention is to provide an apparatus and method for continuously producing and dehydrating gas hydrates.

In particular, the present invention provides the apparatus and method in which gas hydrate slurry formed by reaction between water and gas is dehydrated by centrifugal separation, and water generated by the dehydration is split into fine particles by small perforations of a centrifugal separator and then scattered into a reactor, thus increasing the contact area with gas and promoting the reaction between water and gas. According to the apparatus and method of the present invention, high-density gas hydrates can be continuously produced in large quantities by a simple and efficient production method.

Another object of the present invention is to provide an apparatus and method which can continuously produce high-density dehydrated gas hydrates in such a way that gas hydrate slurry is formed by reaction between water and gas and is simultaneously dehydrated in the same space.

Another object of the present invention is to provide an apparatus and method in which the gas hydrate slurry is continuously produced and easily divided into a liquid portion and a solid portion, and the temperature and pressure in the reactor can be automatically controlled so that the continuous production of gas hydrates can be reliably conducted under conditions of low temperature and high pressure.

In order to accomplish the above object, in an aspect, the present invention provides an apparatus for continuously producing and dehydrating gas hydrates, including: a gas source; a water source; a reactor connected to the gas source and the water source, so that gas and water are respectively supplied from the gas source and the water source into the reactor and react with each other in the reactor to form a gas hydrate slurry; and a spinning wheel and a centrifugal separator provided in the reactor. The spinning wheel supplies the formed gas hydrate slurry to the centrifugal separator, and the centrifugal separator dehydrates the gas hydrate slurry.

The centrifugal separator may include: a basket having a conical shape; a screen installed in the basket; and a screwed rotor disposed inside the screen. The gas hydrate slurry may be supplied into the screwed rotor of the centrifugal separator by the spinning wheel. The gas hydrate slurry supplied into the screwed rotor may be dehydrated by rotation of the centrifugal separator. The dehydrated gas hydrate slurry may be transferred out of the reactor, and water removed from the gas hydrate slurry by the dehydration may be discharged out of the basket and thus re-supplied into the reactor.

The spinning wheel may be rotatable and have an opening and a transfer member. When the spinning wheel rotates, the gas hydrate slurry in the reactor may pass through the opening of the spinning wheel, be drawn up by the transfer member, and then supplied into the centrifugal separator.

The apparatus may further include a screw conveyor unit connected to the reactor. The screw conveyor unit may receive, through a first end thereof, the gas hydrates dehydrated and produced in the reactor and additionally dehydrate the gas hydrates.

The screw conveyor unit may include a rotatable screw. The gas hydrates which are supplied into the first end of the screw conveyor unit may be additionally dehydrated by rotating the screw and then discharged out of the screw conveyor unit through a second end of the screw conveyor unit.

The gas hydrates discharged from the screw conveyor unit may be transferred into a gas hydrate tank.

Furthermore, a recycle pipe may be connected to the gas hydrate tank, so that gas in the gas hydrate tank is re-supplied into the reactor through the recycle pipe.

The screw conveyor unit may be inclined such that the first end thereof is lower than the second end thereof.

In another aspect, the present invention provides a method of continuously producing and dehydrating gas hydrates, including: (a) supplying water and gas into a reactor to form gas hydrate slurry; (b) supplying the gas hydrate slurry into a centrifugal separator using a spinning wheel; (c) dehydrating the supplied gas hydrate slurry by rotating the centrifugal separator; and (d) transferring the dehydrated gas hydrate slurry out of the reactor, and re-supplying water generated by the dehydration into the reactor, wherein (a) through (d) are continuously conducted.

Preferably, (b) supplying the gas hydrate slurry may comprise supplying the gas hydrate slurry into the centrifugal separator by rotating the spinning wheel having a transfer member and by drawing up the gas hydrate slurry using the transfer member.

In addition, (b) supplying the gas hydrate slurry may comprise supplying the gas hydrate slurry into a screwed rotor of the centrifugal separator by rotating the spinning wheel, the spinning wheel having a transfer member which draws up the gas hydrate slurry. Furthermore, (c) dehydrating the gas hydrate slurry supplied into the centrifugal separator may comprise dehydrating the gas hydrate slurry supplied into the centrifugal separator in such a way that the water removed from the gas hydrate slurry is discharged out of the screwed rotor and through a screen and a basket which cover the screwed rotor, and the dehydrated gas hydrate slurry passes only through the screwed rotor.

Moreover, (d) transferring the dehydrated gas hydrate slurry may comprise transferring the dehydrated gas hydrate slurry to a screw conveyor unit and re-supplying water generated by the dehydration into the reactor. The method may further include additionally dehydrating the gas hydrate slurry supplied into the screw conveyor unit by rotating the screw conveyor unit.

BRIEF DESCRIPTION OF THE DRAWINGS

The above and other objects, features, and advantages of the present invention will be more clearly understood from the following detailed description taken in conjunction with the accompanying drawings, in which.

DESCRIPTION OF THE PREFERRED EMBODIMENTS

Hereinafter, a preferred embodiment of the present invention will be described in detail with reference to the attached drawings.

The term 'gas' denotes guest molecules of a gas hydrate. The term 'water' denotes host molecules. Various kinds of molecules, such as $CH_4$, $C_2H_6$, $C_3H_8$, $CO_2$, $H_2$, $SF_6$, etc. can be used as guest molecules when producing the gas hydrates. Below, such guest molecules will be referred to as gases and the host molecules will be called water ($H_2O$).

Furthermore, although a valve will be neither illustrated in the following description nor the drawings to simplify the illustration of the present invention, it must be understood that valves are provided on corresponding pipes and inlets. More preferably, a check valve is used to prevent backflow of fluid.

Figure 1:
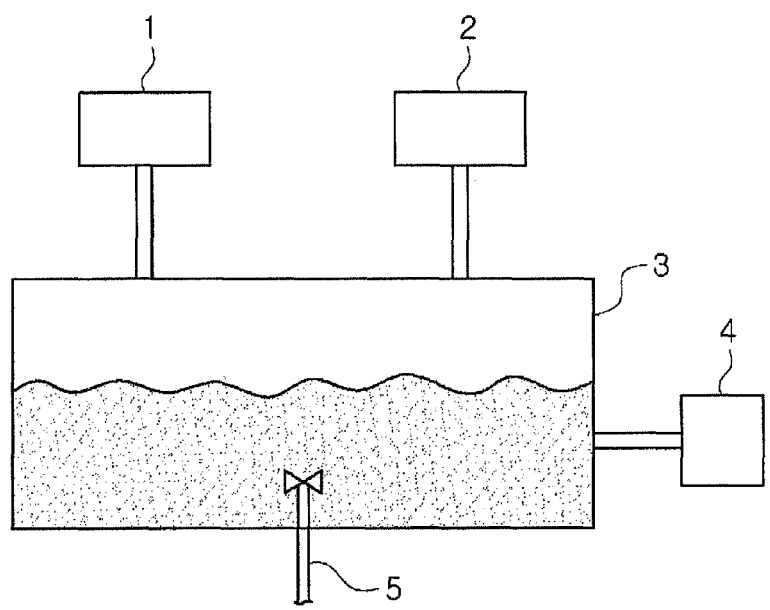
FIG. 1 is a schematic view showing an apparatus for producing gas hydrates, according to a conventional technique.
Figure 2:
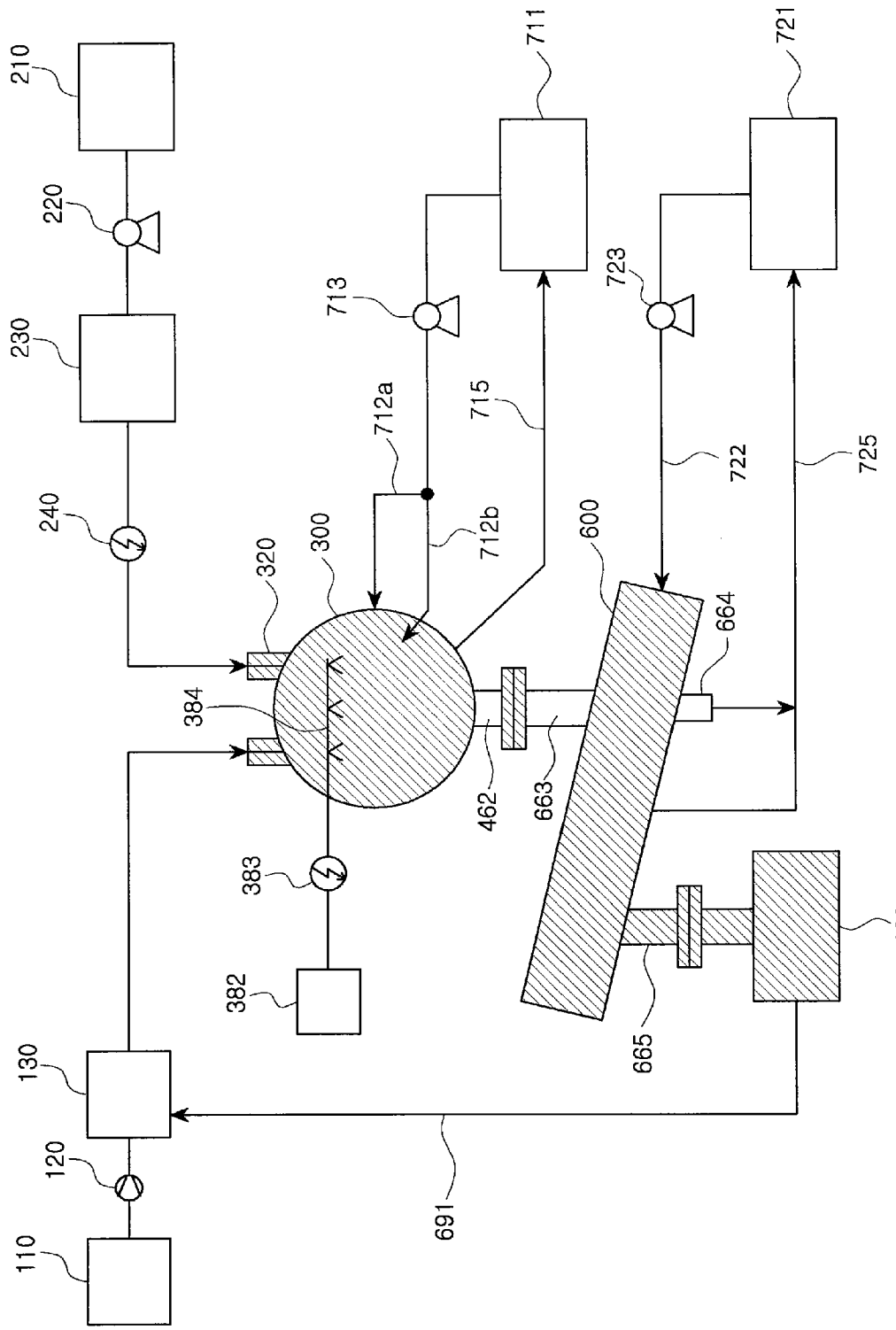
FIG. 2 is a schematic view illustrating the construction of an apparatus for continuously producing and dehydrating gas hydrates, according to an embodiment of the present invention.

1. Description of Apparatus for Continuously Producing and Dehydrating Gas Hydrates An apparatus for continuously producing and dehydrating gas hydrates according to the present invention will be described in detail with reference to FIG. 2.

To produce gas hydrates, water and gas must be supplied into a reactor, and the reactor must maintain a temperature and pressure appropriate to produce gas hydrates.

The apparatus for continuously producing and dehydrating gas hydrates according to the present invention includes a gas source 110, a water source 210, a reactor 300, a centrifugal separator 400 (best shown in FIG. 6), a spinning wheel 500 (best shown in FIG. 6), and a screw conveyor unit 600. The gas source 110 supplies gas to the reactor 300. The water source 210 supplies water to the reactor 300. The gas and water supplied into the reactor 300 react with each other and form gas hydrates. The centrifugal separator 400 is installed in the reactor 300 to dehydrate the gas hydrates. The spinning wheel 500 supplies gas hydrate slurry to the centrifugal separator 400. The screw conveyor unit 600 additionally dehydrates the gas hydrates which have been dehydrated by the centrifugal separator 400.

In detail, gas is supplied from the gas source 110 into the reactor 300 via a buffer tank 130 by a compressor 120. The buffer tank 130 temporarily stores compressed gas supplied from the compressor 120. A separator control unit (not shown) controls corresponding valves depending on a pressure measured by a pressure gauge of the reactor 300, so that when additional supply of gas into the reactor 300 is required, gas can be automatically additionally supplied into the reactor 300 under the control of the control unit.

The buffer tank 130 is connected to a corresponding inlet nipple 320 of the reactor 300 through a separate gas pipe, so that gas is supplied from the buffer tank 130 into the reactor 300 through the gas pipe.

Water is supplied from the water source 210 into the reactor 300 via a water supply tank 230 by a pump 220. A cooling unit 240 is provided between the water source 210 and the reactor 300 to supply cooled water into the reactor 300. The control unit (not shown) controls corresponding valves depending on a water level measured by a water level sensor (not shown) of the reactor 300, so that when additional supply of water into the reactor 300 is required, this additional water can be automatically supplied into the reactor 300 under the control of the control unit.

The water supply tank 230 is connected to a corresponding inlet nipple 320 of the reactor 300 through a separate water pipe, so that cooled water is supplied from the water supply tank 230 into the reactor 300 through the water pipe. Particularly, ice may be used instead of cooled water. In this case, ice may be supplied into the reactor 300 in such a way as to sprinkle the ice using a nozzle (not shown). If water is supplied in the form of ice, nucleation of gas hydrates is promoted, temperature control is facilitated, latent head of ice can be used, and the time during which water contacts gas or stays at a low temperature in the reactor 300 is increased. Thus, gas hydrates can be more efficiently produced.

In this embodiment, although water has been illustrated as being supplied from the water source 210 into the reactor 300 after it is cooled or converted to ice, the present invention is not limited thereto. For example, as another embodiment, water is basically supplied from the water source 210 into the reactor 300 and ice may be additionally supplied into the reactor 300. In this case, ice may be formed by an ice supply unit 382, and formed ice may be sprinkled into the reactor 300 by a sprinkle nozzle 384. A separate cooling unit 383 may be provided on a pipe connecting the ice supply unit 382 to the reactor 300 so as to maintain the temperature of the ice.

Gas hydrates which are formed in the reactor 300 and dehydrated by the centrifugal separator 400 is supplied to the screw conveyor unit 600 through a second transfer pipe 462 and a third transfer pipe 663. The screw conveyor unit 600 further dehydrates gas hydrates in such a way as to rotate a screw. The further dehydrated gas hydrates are transferred into a gas hydrate tank 690 through a gas hydrate transfer pipe 665.

Meanwhile, water which is discharged by the dehydrating operation of the screw conveyor unit 600 can be discharged outside of the apparatus through a separate discharge pipe 664.

Furthermore, the gas hydrate tank 690 is charged with gas hydrates and gas which is not involved in the reaction with water. This gas is transferred to the buffer tank 130 through a recycle pipe 691 and reused to produce gas hydrates.

As mentioned above, gas which is not involved in the reaction with water in the reactor 300 is re-supplied into the reactor 300 through the recycle pipe 691. As will be described below, water which is not involved in the reaction with gas in the reactor 300 can be re-supplied into the reactor 300 by the spinning wheel 500 and the centrifugal separator. Here, the re-supplied water is sprinkled in shapes of particles into the reactor 300 by centrifugal force generated by high-speed rotation of the centrifugal separator, so that the surface area of the water is increased, thus promoting reaction with gas. As such, because gas and water are re-supplied into the reactor 300, consumption of gas and water required for the reaction can be reduced.

The reactor 300 and the screw conveyor unit 600 must be maintained at a relatively low temperature to prevent the formed gas hydrates from being dissociated into gas and water. For this, it is preferable that a separate cooling unit be used.

Figure 6:
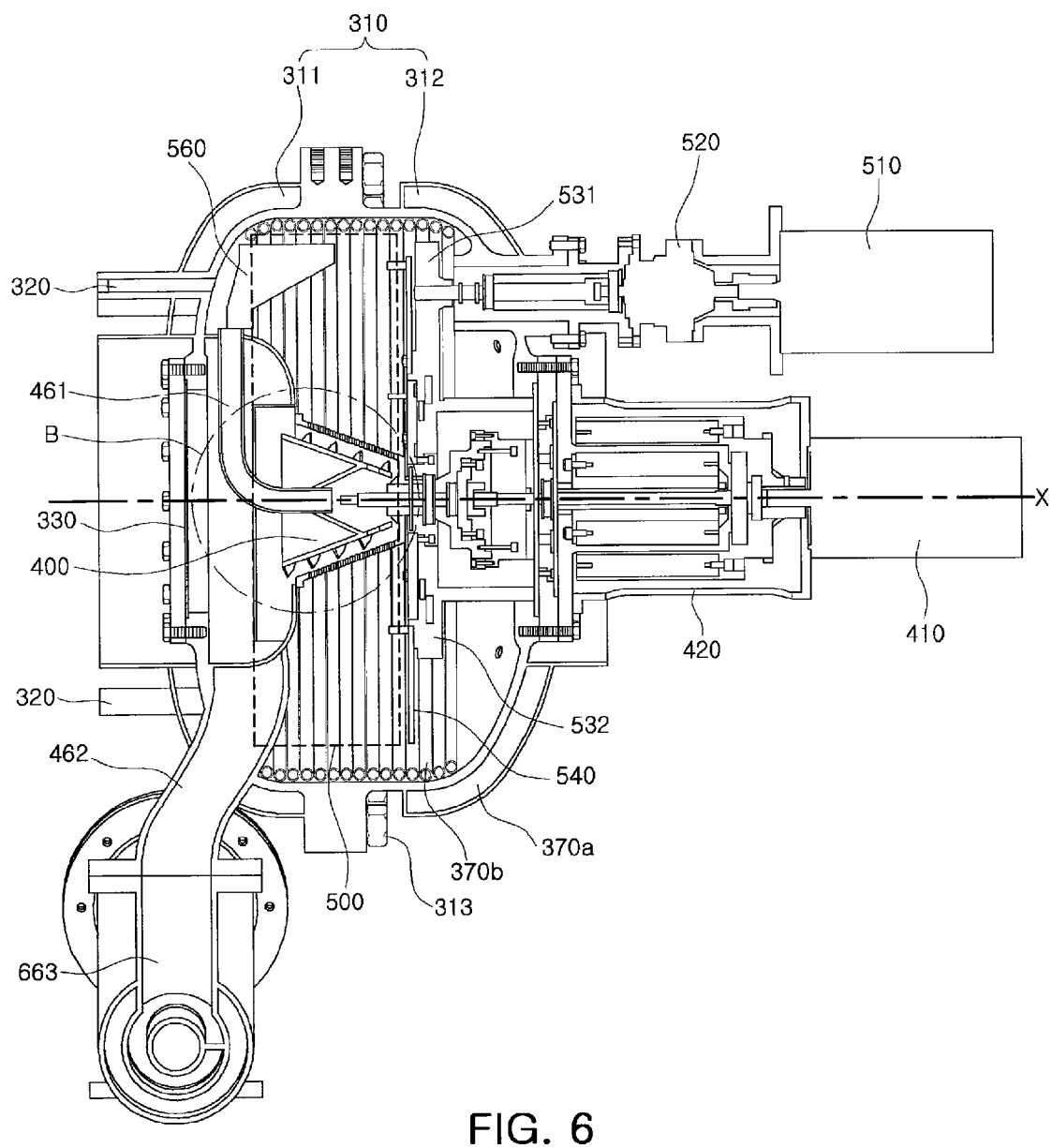
FIG. 6 is a sectional view taken along line A-A' of FIG. 3.

The reactor 300 includes a cooling outer jacket 370*a* (best shown in FIG. 6) and a cooling inner jacket 370*b* (best shown in FIG. 6). Cooling water is supplied from a first cooling water source 711 into the outer jacket 370*a* and the inner jacket 370*b*, through first cooling water pipes 712*a* and 712*b*, respectively. The cooling water is pumped from the first cooling water source 711 by a first cooling water pump 713. The cooling water which has circulated through the outer jacket 370*a* and the inner jacket 370*b* re-circulates through a circulation pipe 715.

The screw conveyor unit 600 also includes a jacket 670 (best shown in FIG. 6). Cooling water is supplied from a second cooling water source 721 into the jacket 670 through a second cooling water pipe 722. The cooling water is pumped from the second cooling water source 721 by a second cooling water pump 723. The cooling water which has circulated through the jacket 670 re-circulates through a circulation pipe 725.

As another embodiment of the present invention, water discharged by the dehydrating operation of the screw conveyor unit 600 may be drawn into the circulation pipe 725 and used as cooling water which re-circulates through the circulation pipe 725.

2. Detailed Construction and Operational Principle of Apparatus for Continuously Producing and Dehydrating Gas Hydrates Hereinafter, the reactor 300, the centrifugal separator 400, the spinning wheel 500, and the screw conveyor unit 600 will be explained in detail with reference to FIGS. 3 through 10.

A. Reactor 300

Figure 3:
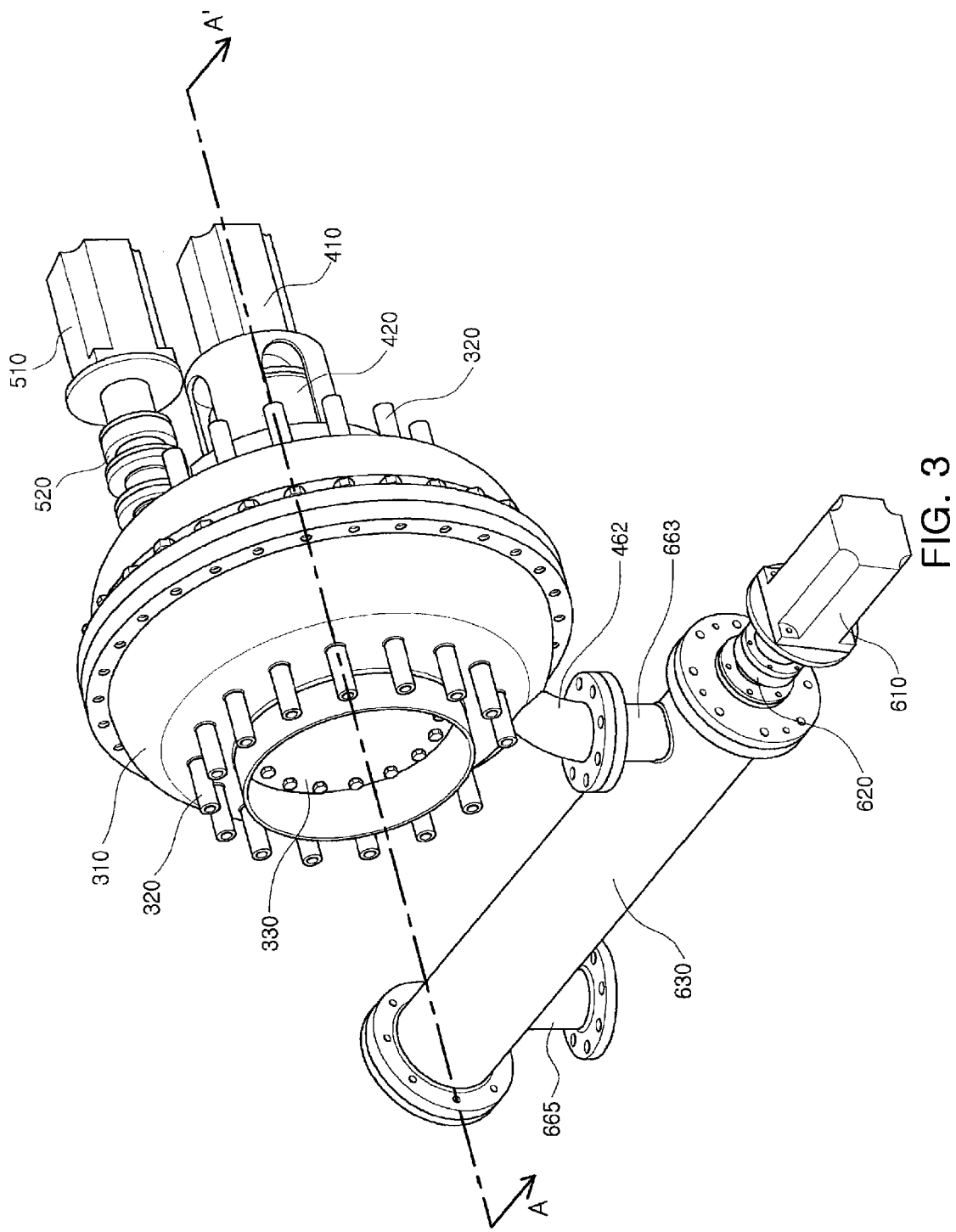
FIG. 3 is a perspective view illustrating the apparatus of FIG. 2.
Figure 4:
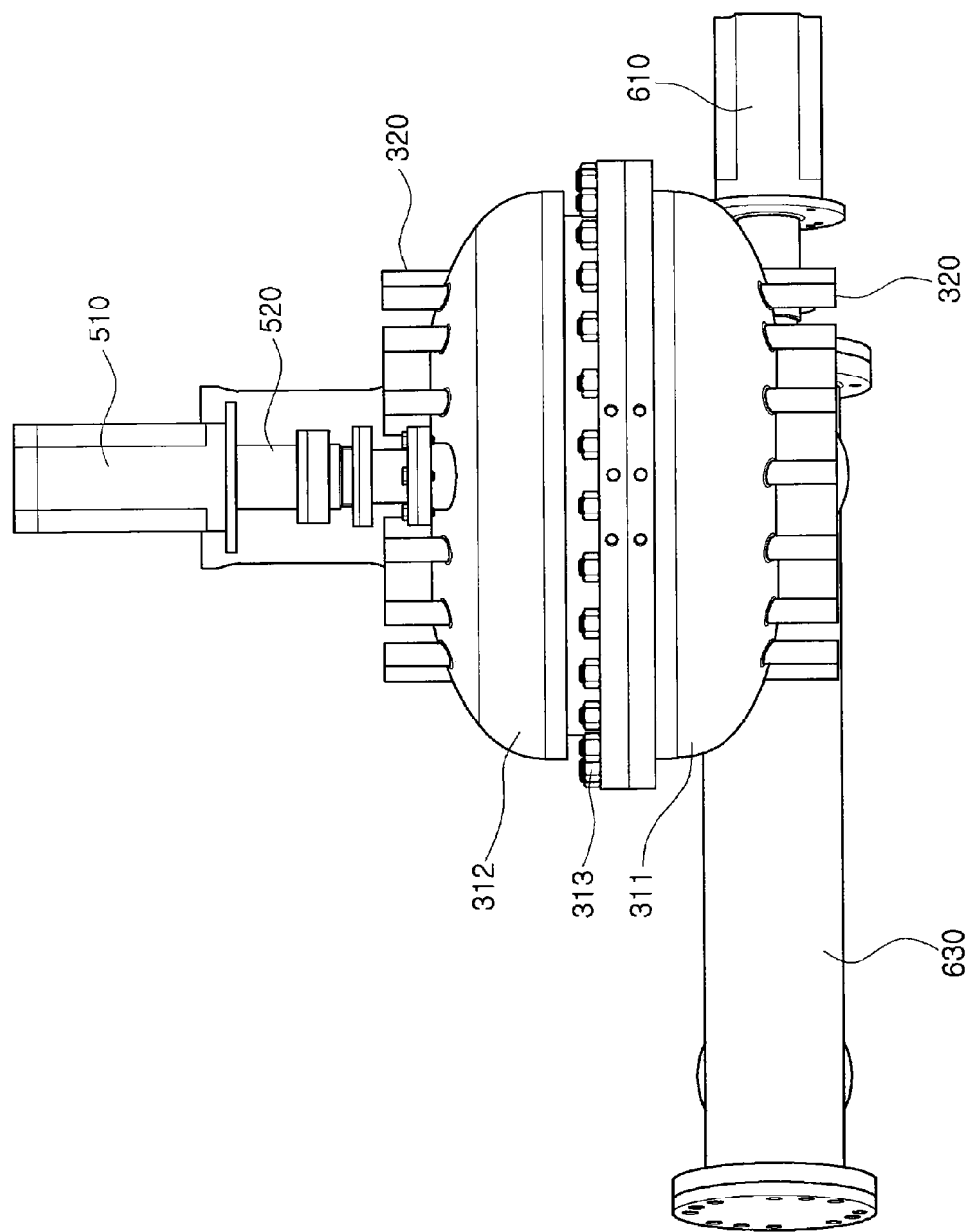
FIG. 4 is a plan view of the apparatus of FIG. 3.
Figure 5:
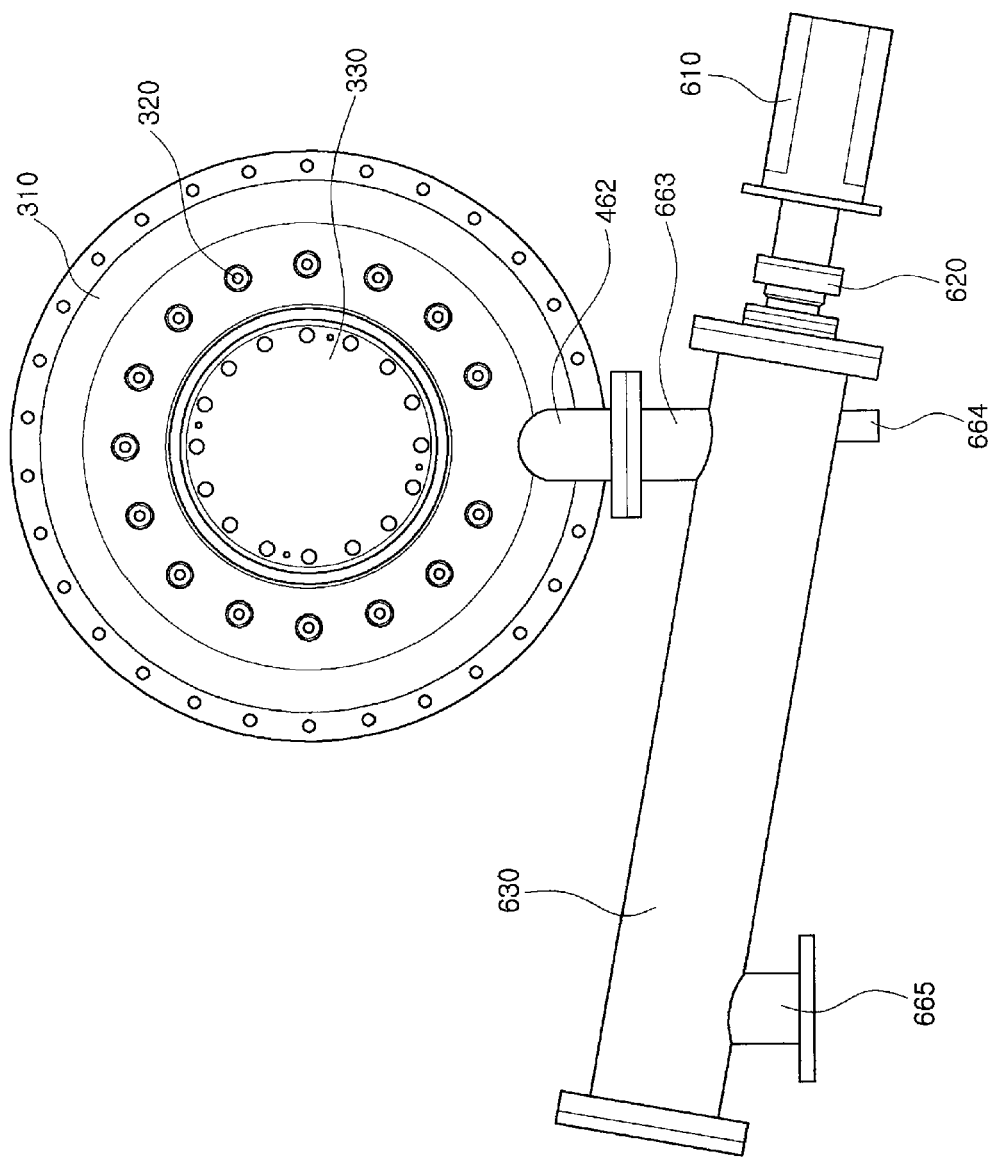
FIG. 5 is a front view of the apparatus of FIG. 3.

FIGS. 3 through 5 are, respectively, a perspective view, a plan view and a front view showing the appearance of the reactor 300 and the screw conveyor unit 600. For the sake of description, the gas source 110, the water source 210, the pipes connected thereto, the gas hydrate tank 690, the cooling water sources 711 and 712, and the pipes connected thereto will be omitted.

The reactor 300 includes a reactor housing 310, a plurality of inlet nipples 320, and an observation window 330 which form the appearance of the reactor 300.

The reactor housing 310 includes a first housing body 311 and a second housing body 312 which are coupled to each other by fastening members 313. The shape of the reactor housing 310 is not limited to a special shape, but it is preferable that the reactor housing 310 have a circular shape for purposes of rotation of the spinning wheel 500.

Gas and water are supplied into the reactor 300 through the inlet nipples 320. As necessary, the number of inlet nipples 320 may be changed, and the number and positions of the inlet nipples 320 are not limited. In the embodiment illustrated in the drawings, a plurality of inlet nipples 320 is provided on each of the front and rear sides of the reactor housing 310.

The observation window 330 is provided to allow a user to observe the interior of the reactor 300.

Gas hydrates which have been formed in the reactor 300 and dehydrated by the centrifugal separator 400 are supplied into the screw conveyor unit 600 through the second and third transfer pipes 462 and 663. The screw conveyor unit 600 includes a screw conveyor housing 630 which forms the appearance thereof. The produced gas hydrates are moved into the gas hydrate tank 690 through the gas hydrate transfer pipe 665.

Meanwhile, the apparatus for continuously producing and dehydrating gas hydrates according to the present invention includes three power units for generating rotational force, and three speed reducers which control the rpm thereof.

In detail, the three power units comprise a first power unit 410 which provides rotational force to the centrifugal separator 400, a second power unit 510 which provides rotational force to the spinning wheel 500, and a third power unit 610 which provides rotational force to the screw conveyor unit 600. The three speed reducers comprise a first speed reducer 420 which controls the rpm of the centrifugal separator 400, a second speed reducer 520 which controls the rpm of the spinning wheel 500, and a third speed reducer 620 which controls the rpm of the screw conveyor unit 600.

It is preferable that a magnetic drive be used as each power unit 410, 510, 610, and the present invention is not limited thereto. Furthermore, it is preferable that a cyclo speed reducer be used as each speed reducer 420, 520, 620, and the present invention is not limited thereto.

Figure 7:
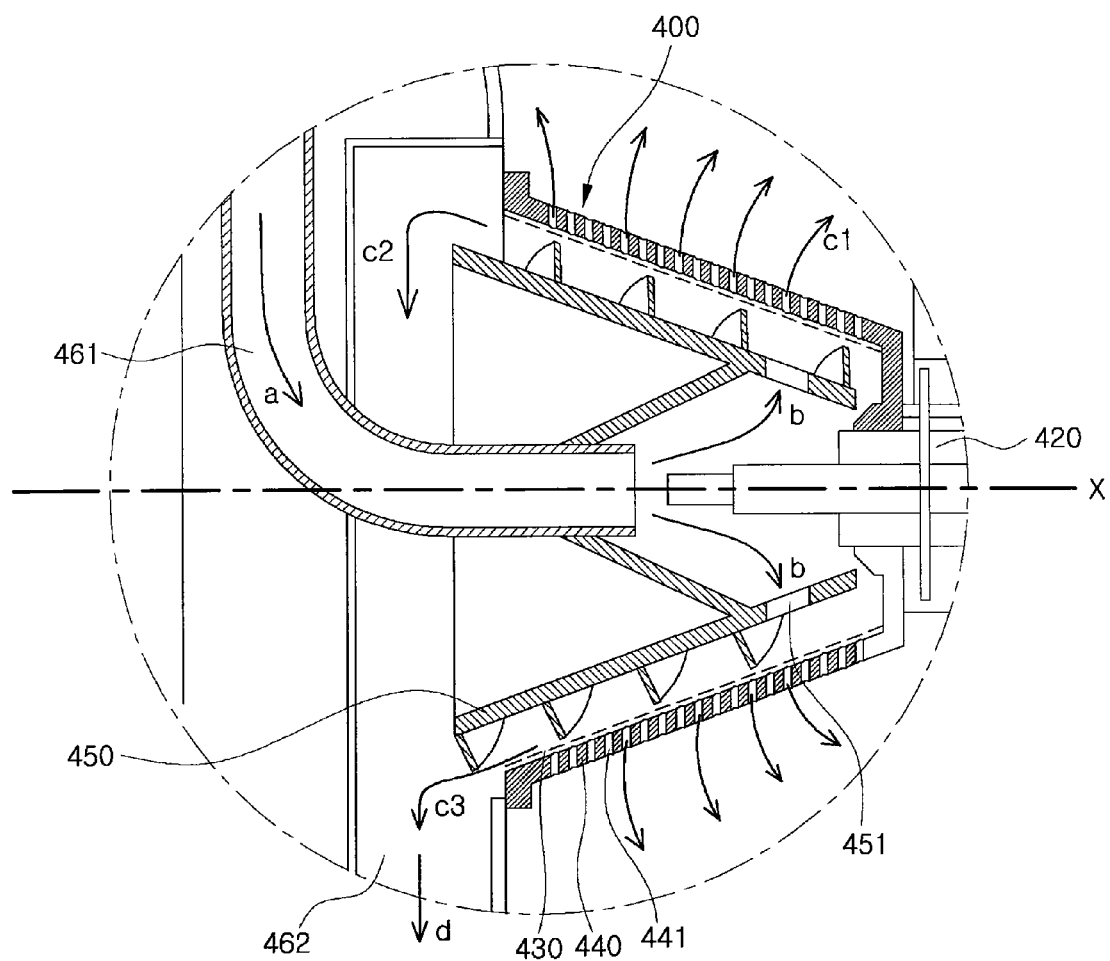
FIG. 7 is an enlarged sectional view showing a circled portion "B" of FIG. 6.

FIG. 6 is a sectional view taken along line A-A' of FIG. 3. FIG. 7 is an enlarged sectional view showing a circled portion "B" of FIG. 6. The operational principle of the apparatus according to the present invention will be described in detail with reference to FIG. 6. For the sake of description, the illustration of the spinning wheel 500 will be simplified (expressed by a dotted line) in FIG. 6. The spinning wheel 500 will be explained in detail later with reference to FIG. 9.

Water and gas are supplied into the reactor 300 through the corresponding input pipes 320. The reactor housing 310 includes the outer and inner jackets 370a and 370b through which cooling water circulates, so that the reactor 300 can be maintained at a temperature appropriate to produce gas hydrates. Furthermore, gas is compressed by the compressor 120 and then supplied into the reactor 300. Thus, the reactor 300 can be maintained at a pressure appropriate to produce gas hydrates. To maintain the temperature and pressure in the reactor 300, the separate control unit (not shown) is connected to the pressure gauge and a thermometer which are provided in the reactor 300, thus controlling the supply of cooling water and compressed gas.

After water and gas are supplied into the reactor 300, gas hydrates are formed by reaction between the water and gas in the state in which the temperature and pressure in the reactor 300 are maintained at a temperature and pressure appropriate to produce gas hydrates.

In the preferred embodiment of the present invention, a level of water in the reactor 300 is maintained at a height of one-third of the reactor 300 during the reaction between the water and gas. The formed gas hydrates are present in the form of a gas hydrate slurry on the water surface. To continuously produce high-density gas hydrates, a process of separating the gas hydrate slurry from the water and dehydrating it is required. For this, the centrifugal separator 400 and the spinning wheel 500 are used.

B. Spinning Wheel 500

Figure 9:
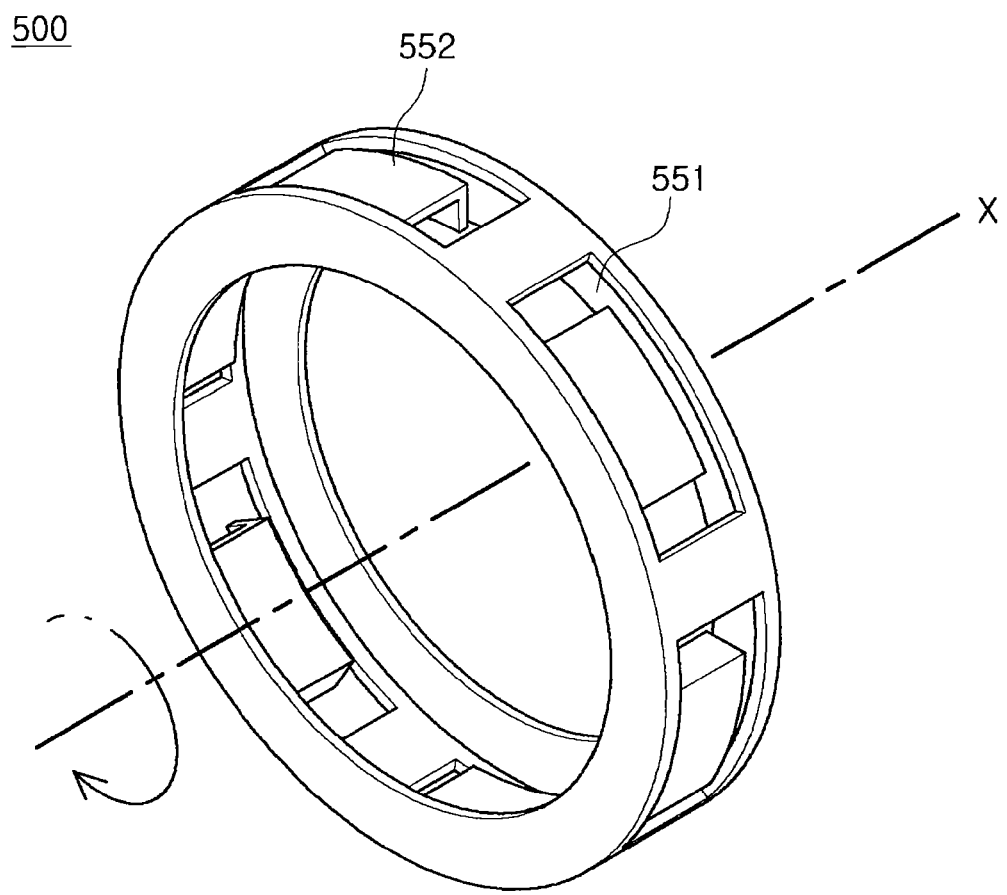
FIG. 9 is a perspective view of a spinning wheel according to the present invention.

The spinning wheel 500 will be explained in detail with reference to FIG. 9.

The spinning wheel 500 preferably has a cylindrical shape to ensure smooth rotation. The spinning wheel 500 has a plurality of openings 551 through which the water and gas hydrate slurry in the reactor 300 pass into the space defined inside the spinning wheel 500 when it rotates. Furthermore, the spinning wheel 500 includes a plurality of transfer members 552 which draw up water and gas hydrate slurry which have passed through the openings 551 into the spinning wheel 500.

Each transfer member 552 has a U-shaped cross-section such that it can easily draw up water and gas hydrate slurry in the direction in which the spinning wheel 500 rotates. In the embodiment shown in FIG. 9, the spinning wheel 500 rotates in a clockwise direction. The orientation of a mouth of the U-shaped transfer member 552 is determined depending on the direction in which the spinning wheel 500 rotates.

With reference to FIG. 6, although it is preferable that the spinning wheel 500 be coaxial with the centrifugal separator 400, they may not be coaxial with each other, as long as gas hydrate slurry and water can be supplied to the centrifugal separator 400 by the rotation of the spinning wheel 500. In FIGS. 6 and 9, the common center axis of the reactor 300, the centrifugal separator 400, and the spinning wheel 500 is designated by the reference character X.

The spinning wheel 500 receives rotational force from the second power unit 510. The rotational force of the second power unit 510 is transmitted to a first gear 531 via the second speed reducer 520. Thereby, a second gear 532 which engages with the first gear 531 is rotated. Furthermore a spinning wheel support 540 is coupled to the second gear 532. The spinning wheel 500 shown in FIG. 9 is supported by the spinning wheel support 540. Thus, the spinning wheel 500 is rotated by the rotation of the second gear 532.

It is preferable that a separate mounting part (not shown) be provided on the spinning wheel 500 to reliably mount the spinning wheel 500 to the spinning wheel support 540.

When the spinning wheel 500 rotates, the water and gas hydrate slurry contained in the lower portion of the reactor 300 are moved upwards by the transfer members 552 of the spinning wheel 500. The water and gas hydrate slurry which moved upwards by the rotation of the spinning wheel 500 are automatically poured into a receiving receptacle 560 when the corresponding transfer members 552 are oriented downwards while the spinning wheel 500 is rotating. To reliably receive the water and gas hydrate slurry, the receiving receptacle 560 preferably has a funnel shape, although the present invention is not limited thereto.

The water and gas hydrate slurry which have been poured into the receiving receptacle 560 are transferred into the centrifugal separator 400 through a first transfer pipe 461.

C. Centrifugal Separator 400

Figure 8:
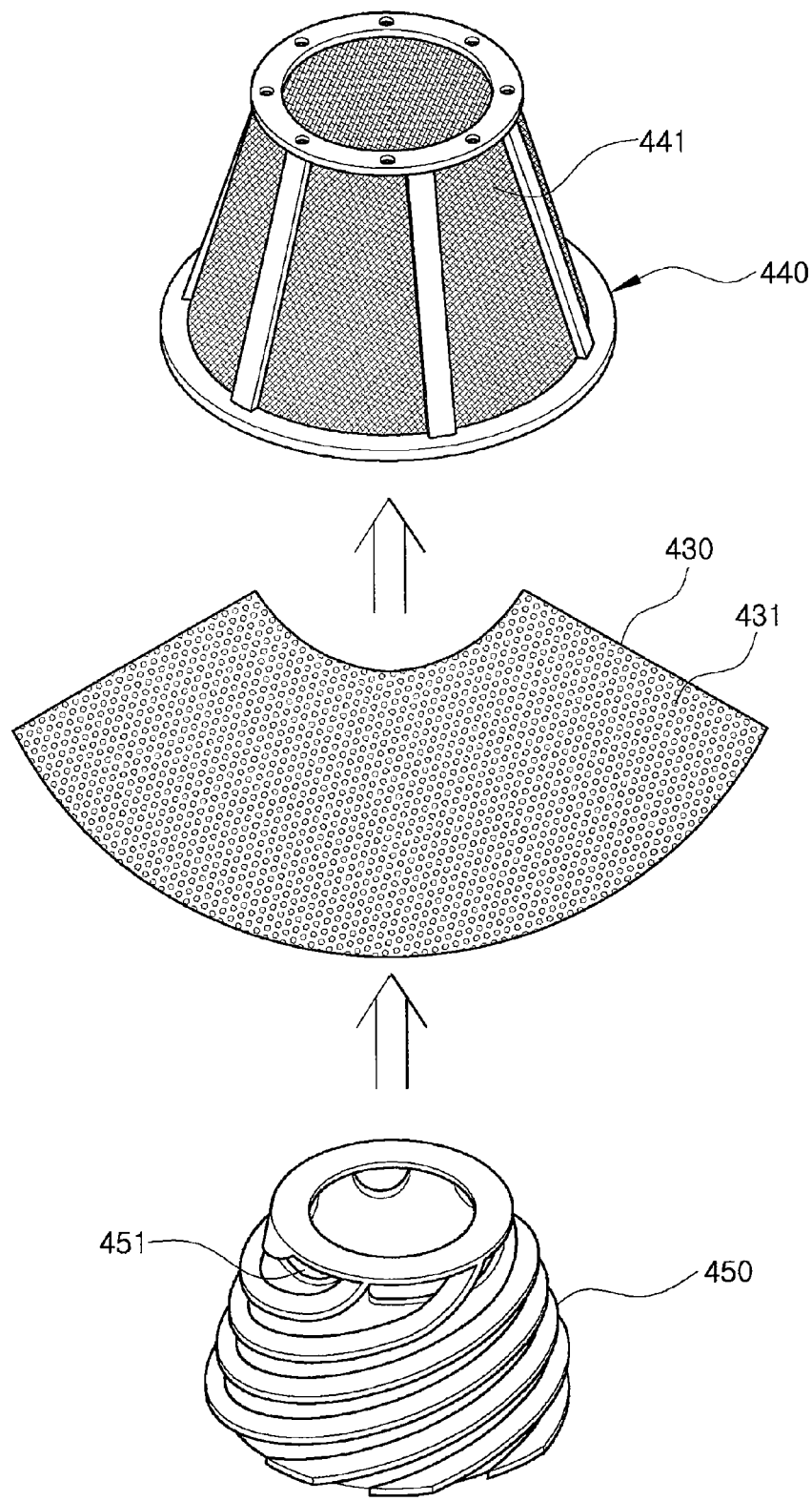
FIG. 8 is of a development view and perspective views illustrating a centrifugal separator according to the present invention.

The construction and operational principle of the centrifugal separator 400 will be explained in detail with reference to FIGS. 7 and 8.

First, the construction of the centrifugal separator 400 will be explained.

The centrifugal separator 400 includes a basket 440, a screen 430 and a screwed rotor 450 in positional sequence going from the outside to the inside. The basket 440 has a plurality of basket openings 441 therein. The screen 430 has a plurality of perforations 431 therein. Openings 451 are formed through the upper end of the sidewall of the screwed rotor 450.

In detail, the screen 430 has the plurality of perforations 431 through which water can pass. Although each perforation 431 is illustrated as having a circular shape, it may have an inverted triangle or slit shape. The screen 430 allows only water to pass through and prevents the gas hydrate slurry from doing so. The screen 430 is formed in a conical shape and installed inside the basket 440.

The basket 440 supports the screen 430 and has the basket openings 441. Water which passes through the screen 430 is dispersed into the reactor 300 through the basket openings 441.

Meanwhile, the first transfer pipe 461 functions to transfer gas hydrate slurry into the centrifugal separator 400. The second transfer pipe 462 functions to transfer the gas hydrates dehydrated by the centrifugal separator 400 into the screw conveyor unit 600.

Next, the operational principle of the centrifugal separator 400 will be explained.

The centrifugal separator 400 is rotated at high speed by the first power unit 410 and the rpm thereof is controlled by the first speed reducer 420. While the centrifugal separator 400 rotates, the gas hydrate slurry which has been drawn up by the spinning wheel 500 is supplied into the screwed rotor 450 through the first transfer pipe 461 (refer to arrow a in FIG. 7). Subsequently, the gas hydrate slurry is discharged towards the screen 430 through the openings 451 by centrifugal force generated by the rotation of the screwed rotor 450 (refer to arrows b in FIG. 7).

The perforations 431 of the screen 430 allow only water to pass through but not solid gas hydrates. The gas hydrates, which do not pass through the screen 430 and from which water has been removed, are transferred through the second transfer pipe 462 (refer to arrows c2 and c3 in FIG. 7). Water which is removed from the gas hydrates by the dehydration is discharged out of the basket 440, that is, scattered into the reactor 300, through the perforations 431 and the basket openings 441 (refer to arrow c1 in FIG. 7). Water scattered into the reactor 300 is used again to react with the gas to produce gas hydrates.

The dehydrated gas hydrates are transferred into the screw conveyor unit 600 through the second transfer pipe 452.

D. Screw Conveyor Unit 600

Figure 10:
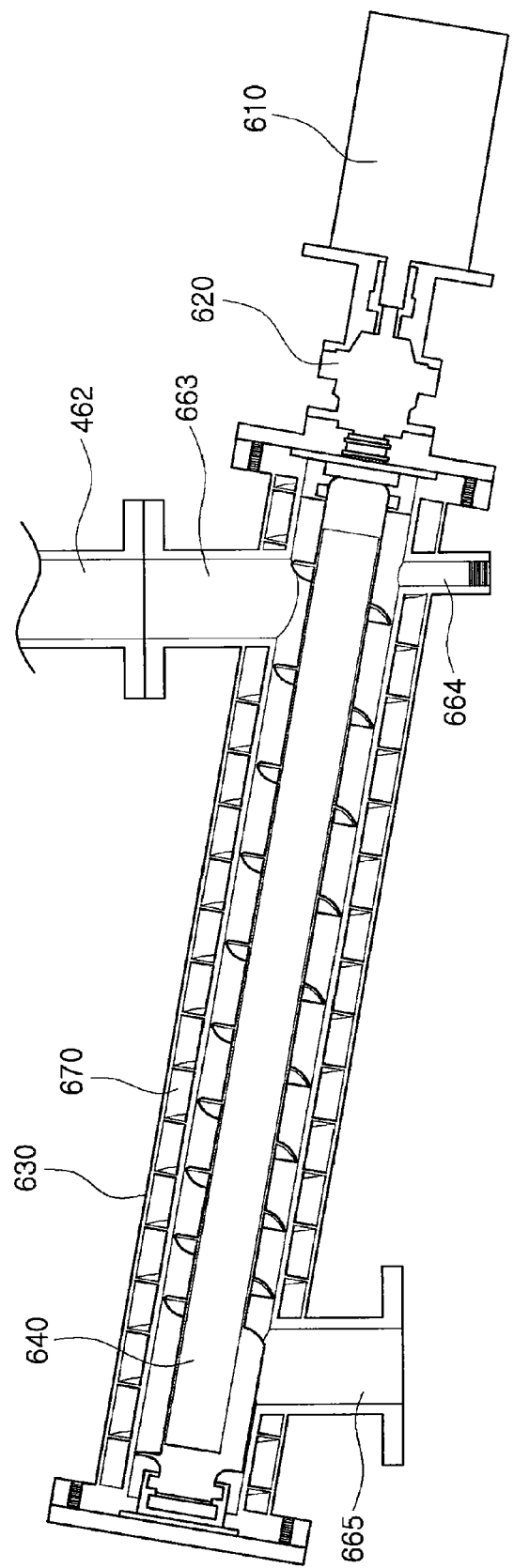
FIG. 10 is a sectional view illustrating a screw conveyor according to the present invention.

The screw conveyor unit 600 which conducts additional dehydrating operation will be explained with reference to FIG. 10.

The screw conveyor unit 600 includes a screw 640, a screw conveyor housing 630, a screw conveyor jacket 670, the third power unit 610, and the third speed reducer 620. The screw conveyor housing 630 contains the screw 640 therein. The screw conveyor jacket 670 encompasses the inner or outer surface of the screw conveyor housing 630. Cooling water circulates through the screw conveyor jacket 670. The third power unit 610 provides rotational force to the screw 640. The third speed reducer 620 functions to control the rpm of the screw 640.

Gas hydrates which have been primarily dehydrated by the centrifugal separator 400 are drawn into a first end of the screw conveyor unit 600 through the second transfer pipe 462 and the third transfer pipe 663 which connects the second transfer pipe 462 to the screw conveyor unit 600.

The screw 640 is rotated by the third power unit 610. The gas hydrates are moved towards a second end of the screw conveyor unit 600 and simultaneously dehydrated by the rotation of the screw 640. Water which is removed from the gas hydrates by dehydration is discharged out of the screw conveyor unit 600 through the separate discharge pipe 664. The screw conveyor unit 600 is in an inclined position so that water can be smoothly discharged by gravity. The discharge pipe 664 is connected to the lower end of the inclined screw conveyor unit 600. In other words, the first end of the screw conveyor unit 600 into which gas hydrates are supplied from the centrifugal separator 400 is disposed at the lower position. In this embodiment, the first end of the screw conveyor unit 600 is illustrated as being disposed at the right side of FIG. 10.

Typically, gas hydrates are produced at a relatively low temperature. Thus, the temperature of water removed from the gas hydrates by dehydration is relatively low. Hence, such water generated by dehydration may be used as cooling water and flow through the circulation pipe 725 connected to the discharge pipe 664. In this case, the water can circulate through the screw conveyor jacket 670.

The gas hydrates that are dehydrated by the rotation of the screw 640 are transferred to the second end of the screw conveyor unit 600 in response to the direction in which the screw 640 rotates. Thereafter, the gas hydrates are transferred into the gas hydrate tank 690 through the gas hydrate transfer pipe 665. In this embodiment, the second end of the screw conveyor unit 600 is illustrated as being disposed at the left side of FIG. 10.

The reactor 300, the screw conveyor unit 600, and the gas hydrate tank 690 are tightly sealed to maintain the pressure constant. Thus, not only gas hydrates but also high-pressure gas which is not involved in the reaction with water can be charged into the gas hydrate tank 690 without leakage. As mentioned above, the high-pressure gas in the gas hydrate tank 690 can be discharged therefrom to the buffer tank 130 through the recycle pipe 691.

3. Method of Continuously Producing and Dehydrating Gas Hydrates

Figure 11:
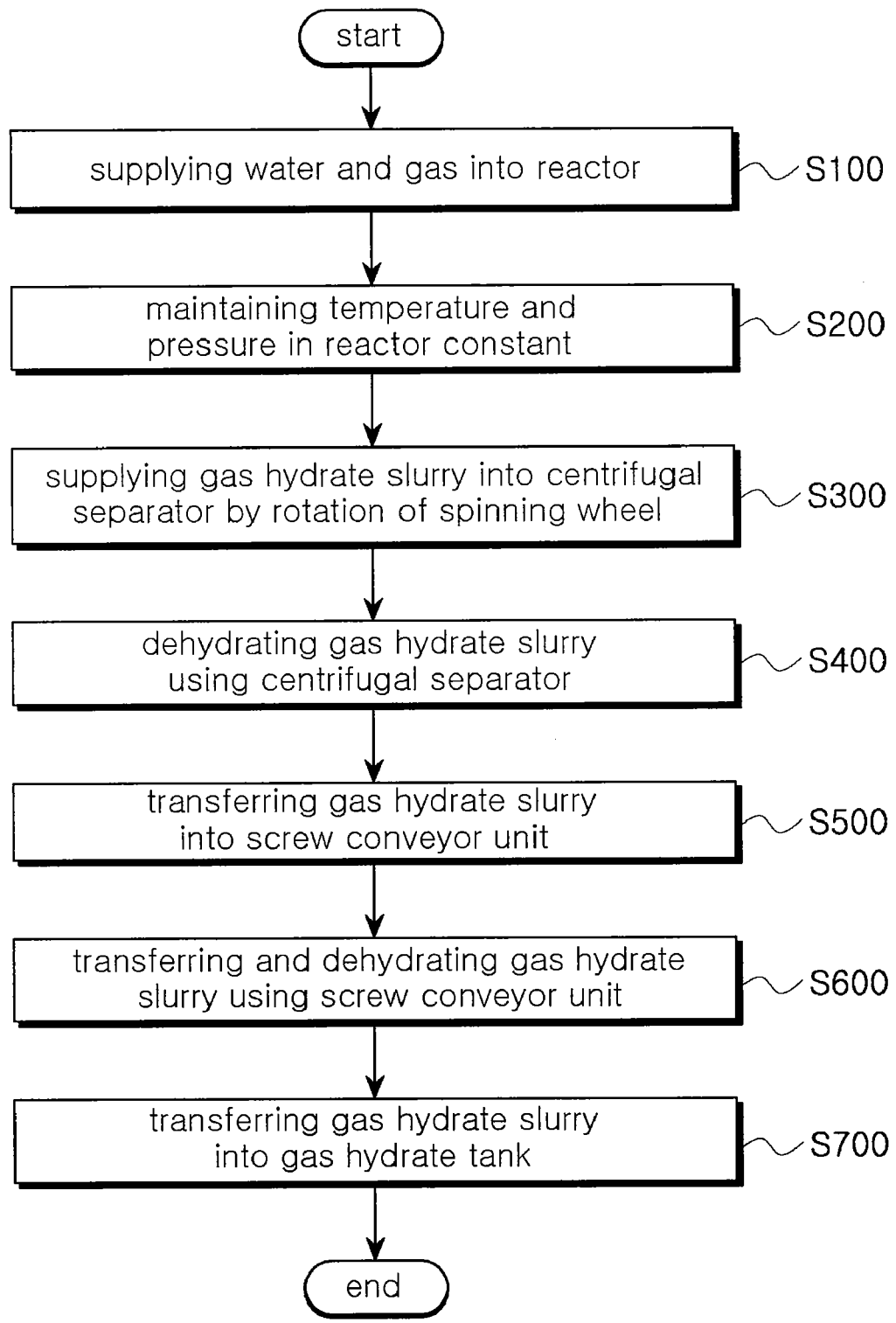
FIG. 11 is a flowchart of a method of showing continuously producing and dehydrating gas hydrates according to the present invention.

The method of continuously producing and dehydrating gas hydrates according to the present invention will be explained with reference to FIG. 11.

At operation S100, gas and water are respectively supplied from the gas source 110 and the water source 210 into the reactor 300.

Here, the gas may be supplied into the reactor 300 by compression of the compressor 120. The water may be supplied into the reactor 300 after it is cooled by the cooling unit 240. At operation S200, the interior of the reactor 300 is maintained at a pressure and temperature appropriate to produce gas hydrates. Of course, the appropriate pressure and temperature may be changed depending on the kind of guest molecules.

Water is continuously supplied into the reactor 300. It is suitable that the level of water be maintained at a height of one-third of the reactor 300, although the present invention is not limited thereto. Gas hydrate slurry is formed in the reactor 300 under a predetermined temperature and pressure. The gas hydrate slurry is supplied into the centrifugal separator 400 by rotation of the spinning wheel 500, at operation S300.

At operation S400, the gas hydrate slurry is dehydrated by rotation of the centrifugal separator 400. In this operation, water removed from the gas hydrate slurry is scattered from the centrifugal separator 400 and supplied again into the reactor 300. At operation S500, the dehydrated gas hydrate slurry is transferred into the screw conveyor unit 600.

At operation S600, the gas hydrates transferred into the screw conveyor unit 600 are additionally dehydrated by rotation of the screw 640.

At operation S700, the additionally-dehydrated gas hydrates are transferred to the gas hydrate tank 690.

Meanwhile, when the pressure or the level of water in the reactor 300 is lowered by the reaction between gas and water, the pressure gauge or the water level sensor senses this, and the control unit (not shown) supplements water or gas into the reactor 300. Gas hydrates are continuously produced by repeatedly conducting the operations S100 through S700.

Furthermore, if it is detected that the pressure of gas in the gas hydrate tank 690 is higher than the reference pressure, the control unit (not shown) moves gas from the gas hydrate tank 690 into the buffer tank 130.

As described above, in an apparatus and method for continuously producing and dehydrating gas hydrates according to the present invention, the operation of dehydrating gas hydrates can be more efficiently conducted by a centrifugal separation principle, thus enhancing the hydrate producing efficiency. Furthermore, high-density gas hydrates can be produced, and gas hydrates can be continuously produced in the same space.

Furthermore, because a centrifugal separator and a spinning wheel are used, gas hydrates can be produced and dehydrated at the same time in the same compact space. Thus, the time taken to produce high-density gas hydrates and the required power can be reduced.

In addition, the gas hydrates are primarily dehydrated by the centrifugal separator and then secondarily dehydrated by a screw conveyor unit. Thereby, higher-density gas hydrates can be produced.

Moreover, the gas which is not involved in reaction with water in the reactor is re-supplied into the reactor through a recycle pipe, and water which is not involved in reaction with gas is re-supplied into the reactor by the spinning wheel and high-speed rotation of the centrifugal separator. The amount of water and gas required to produce gas hydrates can be reduced. A process of dissolving additional gas which is required to form a gas hydrate nucleus can be skipped. Therefore, the reaction between water and gas can be further promoted.

Although the preferred embodiment of the present invention has been disclosed for illustrative purposes, those skilled in the art will appreciate that various modifications, additions, and substitutions are possible, without departing from the scope and spirit of the invention as disclosed in the accompanying claims.

What is claimed:

1. An apparatus for continuously producing and dehydrating gas hydrates, comprising:
   a gas source;
   a water source;
   a reactor connected to the gas source and the water source, so that gas and water are respectively supplied from the gas source and the water source into the reactor and react with each other in the reactor to form a gas hydrate slurry; and
   a spinning wheel and a centrifugal separator provided in the reactor, the spinning wheel supplying the formed gas hydrate slurry to the centrifugal separator, and the centrifugal separator dehydrating the gas hydrate slurry.

2. The apparatus as set forth in claim 1, wherein the centrifugal separator comprises:
   a basket having a conical shape;
   a screen installed in the basket; and
   a screwed rotor disposed inside the screen,
   wherein the gas hydrate slurry is supplied into the screwed rotor of the centrifugal separator by the spinning wheel, and
   the gas hydrate slurry supplied into the screwed rotor is dehydrated by rotation of the centrifugal separator, the dehydrated gas hydrate slurry is transferred out of the reactor, and water removed from the gas hydrate slurry by the dehydration is discharged out of the basket and thus re-supplied into the reactor.

3. The apparatus as set forth in claim 1, wherein the spinning wheel is rotatable and has an opening and a transfer member,
   whereby when the spinning wheel rotates, the gas hydrate slurry in the reactor passes through the opening of the spinning wheel, is drawn up by the transfer member, and then supplied into the centrifugal separator.

4. The apparatus as set forth in claim 1, further comprising:
   a screw conveyor unit connected to the reactor, the screw conveyor unit receiving, through a first end thereof, the gas hydrates dehydrated and produced in the reactor and additionally dehydrating the gas hydrates.

5. The apparatus as set forth in claim 4, wherein the screw conveyor unit comprises:
   a rotatable screw,
   wherein the gas hydrates which are supplied into the first end of the screw conveyor unit are additionally dehydrated by rotating the screw and then discharged out of the screw conveyor unit through a second end of the screw conveyor unit.

6. The apparatus as set forth in claim 5, wherein the gas hydrates discharged from the screw conveyor unit are transferred into a gas hydrate tank.

7. The apparatus as set forth in claim 6, wherein a recycle pipe is connected to the gas hydrate tank, so that gas in the gas hydrate tank is re-supplied into the reactor through the recycle pipe.

8. The apparatus as set forth in any one of claims 5 through 7, wherein the screw conveyor unit is inclined such that the first end thereof is lower than the second end thereof.

9. The apparatus as set forth in any one of claims 1 through 4, further comprising:
   an ice supply unit connected to the reactor to supply ice into the reactor.

10. The apparatus as set forth in any one of claims 1 through 4, wherein the water supplied into the reactor is sprinkled in a form of ice into the reactor by a sprinkle nozzle.

11. The apparatus as set forth in any one of claims 1 through 4, wherein the reactor comprises an inner jacket and an outer jacket,
    wherein cooling water circulates through each of the inner jacket and the outer jacket.

12. A method of continuously producing and dehydrating gas hydrates, comprising:
    (a) supplying water and gas into a reactor to form gas hydrate slurry;
    (b) supplying the gas hydrate slurry into a centrifugal separator using a spinning wheel;
    (c) dehydrating the supplied gas hydrate slurry by rotating the centrifugal separator; and
    (d) transferring the dehydrated gas hydrate slurry out of the reactor, and re-supplying water generated by the dehydration into the reactor,
    wherein (a) through (d) are continuously conducted.

13. The method as set forth in claim 12, wherein (b) supplying the gas hydrate slurry comprises supplying the gas hydrate slurry into the centrifugal separator by rotating the spinning wheel having a transfer member and by drawing up the gas hydrate slurry using the transfer member.

14. The method as set forth in claim 12, wherein
    (b) supplying the gas hydrate slurry comprises supplying the gas hydrate slurry into a screwed rotor of the centrifugal separator by rotating the spinning wheel, the spinning wheel having a transfer member which draws up the gas hydrate slurry, and
    (c) dehydrating the gas hydrate slurry supplied into the centrifugal separator comprises dehydrating the gas hydrate slurry supplied into the centrifugal separator in such a way that the water removed from the gas hydrate slurry is discharged out of the screwed rotor and through a screen and a basket which cover the screwed rotor, and the dehydrated gas hydrate slurry passes only through the screwed rotor.

15. The method as set forth in claim 12, wherein
    (d) transferring the dehydrated gas hydrate slurry comprises transferring the dehydrated gas hydrate slurry to a screw conveyor unit and re-supplying water generated by the dehydration into the reactor,
    the method further comprising:
    additionally dehydrating the gas hydrate slurry supplied into the screw conveyor unit by rotating the screw conveyor unit.

* * * * *

UNITED STATES PATENT AND TRADEMARK OFFICE
CERTIFICATE OF CORRECTION

PATENT NO. : 8,367,880 B2  
APPLICATION NO. : 12/785599  
DATED : February 5, 2013  
INVENTOR(S) : Ju Dong Lee et al.

Page 1 of 1

It is certified that error appears in the above-identified patent and that said Letters Patent is hereby corrected as shown below:

On the Cover Page, item (73), Assignees: Daewood Engineering & Construction Co., Ltd. should read
-- Daewoo Engineering & Construction Co., Ltd. --

Signed and Sealed this
Nineteenth Day of March, 2013

Teresa Stanek Rea
*Acting Director of the United States Patent and Trademark Office*